J. SARGENT.
Machines for Corrugating and Beading Sheet-Metal Pipe.
No. 142,945. Patented September 16, 1873.
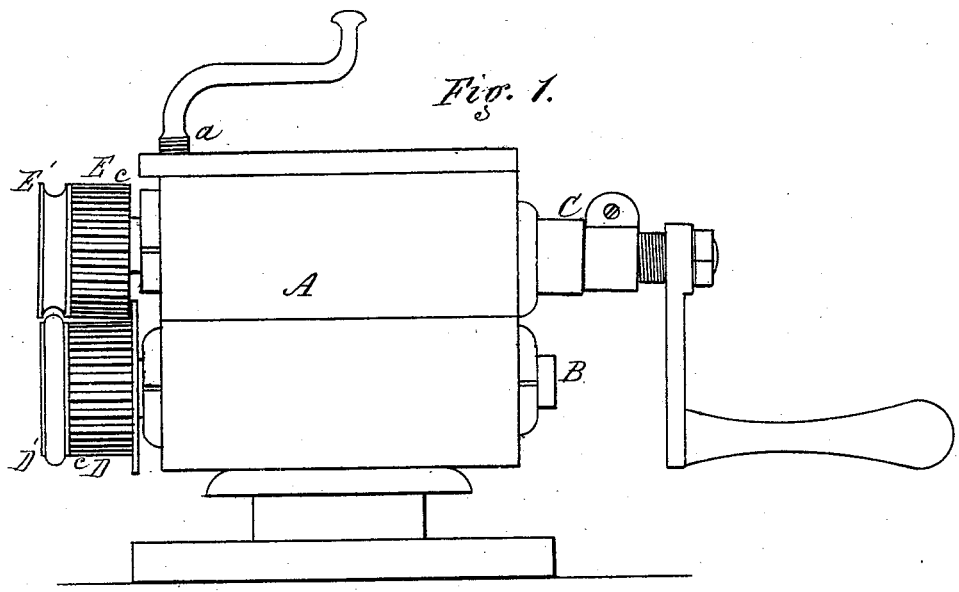
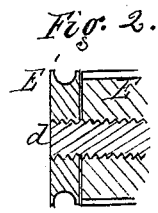
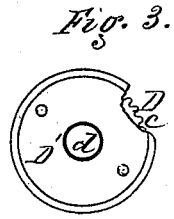
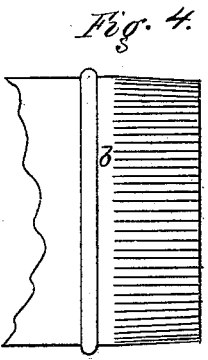
Witnesses.
Alfred Hadley
Henry M. Thomas
Inventor.
James Sargent,
per R. F. Osgood,
atty.

UNITED STATES PATENT OFFICE.

JAMES SARGENT, OF ROCHESTER, NEW YORK.

IMPROVEMENT IN MACHINES FOR CORRUGATING AND BEADING SHEET-METAL PIPE.

Specification forming part of Letters Patent No. 142,945, dated September 16, 1873; application filed May 21, 1873.

*To all whom it may concern:*

Be it known that I, JAMES SARGENT, of the city of Rochester, in the county of Monroe and State of New York, have invented a certain new and useful Improvement in Machines for Corrugating and Beading the Ends of Sheet-Metal Pipes; and I do hereby declare that the following is a full, clear, and exact description of the construction and operation of the same.

The object of my improvement is to corrugate and bead the ends of stove and other pipes at one and the same operation; the corrugations being for the purpose of reducing the diameter and tapering the end, so that it will easily and readily slip into the next section, while the bead is for the purpose of furnishing a stop to prevent the sections of the pipe from slipping too far one upon the other.

To accomplish this end, I combine two rollers, having each intermatching teeth, which produce the corrugations, and having a convex and concave head, which produce the bead.

In the drawings, Figure 1 is an elevation of my improvement. Fig. 2 is a vertical section of one of the rollers and its concave head. Fig. 3 is an end elevation of the lower roller. Fig. 4 is a plan of the complete pipe.

A is a frame of any desired kind, in which are mounted two shafts, B C, having rollers D E at one end, by which the work is done. One shaft, B, has a fixed position, but rotates upon its axis. The other shaft, C, is made adjustable in position by any desired means—for instance, by a spring, which sets under the box next to the roller, and a set-screw, $a$, above.

The object of this adjustment is to allow the rollers to be separated to receive the edge of the pipe, and also to vary the depth and length of the corrugations on the end of the pipe, which is done by setting the upper roller higher or lower, thereby striking deeper or shallower. By this means, the corrugations may gradually extend inward on the pipe till they finally vanish or merge in the circle of the pipe, leaving a narrow rim, $b$, between the end of the corrugations and the bead for the close fitting of the next section, as shown in Fig. 4. This rim may be increased or lessened in extent by changing the angle of the roller more or less.

The rollers each consist of a cylindrical body, having longitudinal teeth $c\ c$, which intermatch to produce the corrugations. On the outer ends of the rollers are attached the convex and concave heads $D'\ E'$, which also intermatch to produce the bead. These may be formed solid with the rollers; but I prefer to make them separate, and screw them onto the central screw-bearing $d$, or attach them in some equivalent way, so that they may be easily removed.

I am aware that it is not new to corrugate the ends of pipe, nor to pass the pipe between the rollers for the purpose of corrugating by a continuous action; neither is it new to roll a bead in pipe. But heretofore, so far as I am aware, the corrugating and beading have been done by separate actions. I do the whole at a single operation, and accomplish it by combining the beading mechanism and corrugating mechanism in a single device. This not only saves one operation, but it really does better work, since the parts always retain their relative position to each other, and the bead and corrugations are always equally distant and true in position, which cannot be the case when each is formed separately.

Having thus described my invention, what I claim as new, and desire to secure by Letters Patent, is—

The combination, in a machine for corrugating and beading metal pipes, of the corrugating-rollers D E and beading-heads $D'\ E'$, when arranged to operate in the manner and for the purpose specified.

In witness whereof I have hereunto signed my name in the presence of two subscribing witnesses.

JAMES SARGENT.

Witnesses:
R. F. OSGOOD,
HENRY M. THOMAS.